(12) United States Patent
Matsuzuki et al.

(10) Patent No.: US 6,615,711 B2
(45) Date of Patent: Sep. 9, 2003

(54) PRESS-FORMING MACHINE FOR GLASS

(75) Inventors: Isao Matsuzuki, Numazu (JP);
Hidetoshi Kitahara, Atami (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 10/160,242

(22) Filed: Jun. 4, 2002

(65) Prior Publication Data

US 2003/0029332 A1 Feb. 13, 2003

(30) Foreign Application Priority Data

Jun. 15, 2001 (JP) ........................................ 2001-181630

(51) Int. Cl.[7] ........................ B30B 15/32; C03B 11/00; A01J 21/00
(52) U.S. Cl. .................. 100/218; 100/295; 65/305; 65/321; 425/414; 425/422
(58) Field of Search ................... 100/218, 295; 72/344, 345, 355.6; 425/422, 414; 65/321, 305, 320, 317

(56) References Cited

U.S. PATENT DOCUMENTS

| | | | |
|---|---|---|---|
| 4,008,031 A | * | 2/1977 | Weber ........................ 425/567 |
| 4,434,646 A | * | 3/1984 | Maeda et al. ................. 72/451 |
| 4,645,446 A | * | 2/1987 | Hehl ........................... 425/350 |
| 5,560,939 A | * | 10/1996 | Nakagawa et al. ......... 425/139 |
| 5,616,161 A | * | 4/1997 | Morikita ...................... 65/157 |
| 5,855,824 A | * | 1/1999 | Saito et al. .................. 264/2.2 |
| 6,003,339 A | * | 12/1999 | Morikita ...................... 65/275 |

* cited by examiner

*Primary Examiner*—Allen Ostrager
*Assistant Examiner*—Jimmy Nguyen
(74) *Attorney, Agent, or Firm*—Pillsbury Winthrop LLP

(57) ABSTRACT

An object of the present invention is to facilitate the release of a formed product from a die. A lower die is formed of a die plate, a plurality of cores, a cavity die and a slide plate. In the cavity die, a plurality of first opening portions are formed at the upper side and a second opening portion is formed at the lower surface side. Each of the first opening portion communicates the second opening portion. A core is placed each of the first opening portions. The slide plate is fitted in the second opening portion and supports each core from the lower side. A through-hole is formed in the die plate. The tip of an ejector pin is inserted into the through-hole. The ejector pin is installed in a lower shaft of the machine.

4 Claims, 5 Drawing Sheets

PRESS-FORMING MACHINE FOR GLASS

CROSS-REFERENCE TO RELATED APPLICATIONS

This application is based upon and claims the benefit of priority from the prior Japanese Patent Application No. 2001-181630, filed Jun. 15, 2001, the entire contents of which are incorporated herein by reference.

BACKGROUND

1. Field of the Invention

The present invention relates to a press-forming machine for manufacturing a formed product made of glass such as an optical lens and prism, and more particularly, to a mechanism for taking out a product from a die after press forming.

2. Description of the Related Art

Not only a polishing method but also a re-heat press forming method is employed to manufacture an optical element made of glass such as an optical lens or prism, which must be formed with high accuracy of dimension. In the re-heat press forming method, glass as a raw-material is melted and solidified in a mold to obtain a preform roughly shaped. The preform was further heated and press-formed by use of dies, thereby transferring the patterns of the dies to the glass. In this manner, the optical element is formed.

Since the re-heat press forming method requires only one press-forming step for forming a curved surface, the productivity is high. Also, this method requires no polishing step. Therefore, an optical element can be manufactured under clean environment. Furthermore, once dies are manufactured, a large number of formed products can be efficiently manufactured in accordance with accuracy varied depending upon dies.

For example, when an optical lens is manufactured by press forming, more specifically, when the upper and lower optical surfaces and side surface of the optical lens are simultaneously formed, a formed product is usually taken out from the lower die by using a vacuum chuck, after the pressing and cooling steps are completed and the dies are opened. However, there is a problem in this case. Since the formed product is buried in the cavity of the lower die, it is not easy to be taken out. As a result, a device for supplying a preform and taking out a formed product must be formed with a more complicated structure, and much time is required for collecting the formed products.

A formed product may be taken out by pushing it by an ejector pin in the same manner as in an injection-molding machine. However, this method has a problem in that a formed product may be scratched or fractured by the ejector pin, which comes directly in touch with the optical surface of the formed product.

SUMMARY

The inventions described and/or claimed herein have been achieved in view of the problems of conventional press forming of glass, as mentioned above. An object of the present invention is to provide a press-forming machine for glass provided with a structural element facilitating taking-out of a press-formed product from a die.

A press forming machine for glass according to the present invention is used for performing press-forming of glass at elevated temperature by using an upper die supported by an upper shaft from an upper surface side and a lower die supported by a lower shaft from a lower surface side.

The lower die comprises:
- a core having a pattern on an upper surface;
- a cavity die surrounding the outer periphery of the core and guiding the core along the outer periphery; and
- a die plate supporting the core and the cavity die from the lower-surface side and having a vertically extended through-hole formed therein.

In the press-molding machine, a vertically movable ejector pin is installed within the lower shaft, the tip of the ejector pin being inserted into the through-hole, and a formed product is pushed out from the cavity die by pushing up the core by the ejector pin.

According to the press-forming machine for glass of the present invention, after pressing and cooling steps are completed and the dies are opened, the ejector pin is moved to push up the core, thereby pushing out a formed product from the cavity die. In this manner, formed products can be easily taken out from the press-forming machine and collected, by using, for example, an automatic transfer apparatus.

In the aforementioned configuration, the lower die may be substituted by an upper die formed of the same structural elements as those of the lower die, namely, a core, cavity die and die plate. Further, the upper shaft is equipped with an ejector pin for pushing down the core installed therein.

A plurality of formed products can be simultaneously manufactured by fitting a plurality of cores to the upper and lower dies.

In this case, the lower die preferably comprises:
- a plurality of cores each having a pattern on an upper surface thereof;
- a cavity die having a plurality of first opening portions at an upper surface side and a second opening portion at the lower surface side, each of the first opening portions communicating with the second opening portion and guiding the corresponding core from an outer peripheral side;
- a slide plate housed in the second opening portion and supporting each of the plurality of cores from a lower surface side; and
- a die plate supporting the slide plate and cavity die from the lower surface side and having a vertically extended through-hole formed therein.

In this case, a vertically movable ejector pin is installed within the lower shaft, the tip of the ejector pin being inserted into the through-hole, and a formed product is pushed out from the cavity die by pushing up the core via the slide plate by the ejector pin.

In the aforementioned configuration, the lower die may be substituted by an upper die formed of the same structural elements as those of the lower die, namely, cores, a cavity die, die plate and slide plate. Further, the upper shaft is equipped with an ejector pin for pushing down the cores therein.

DETAILED DESCRIPTION

Figure 1:
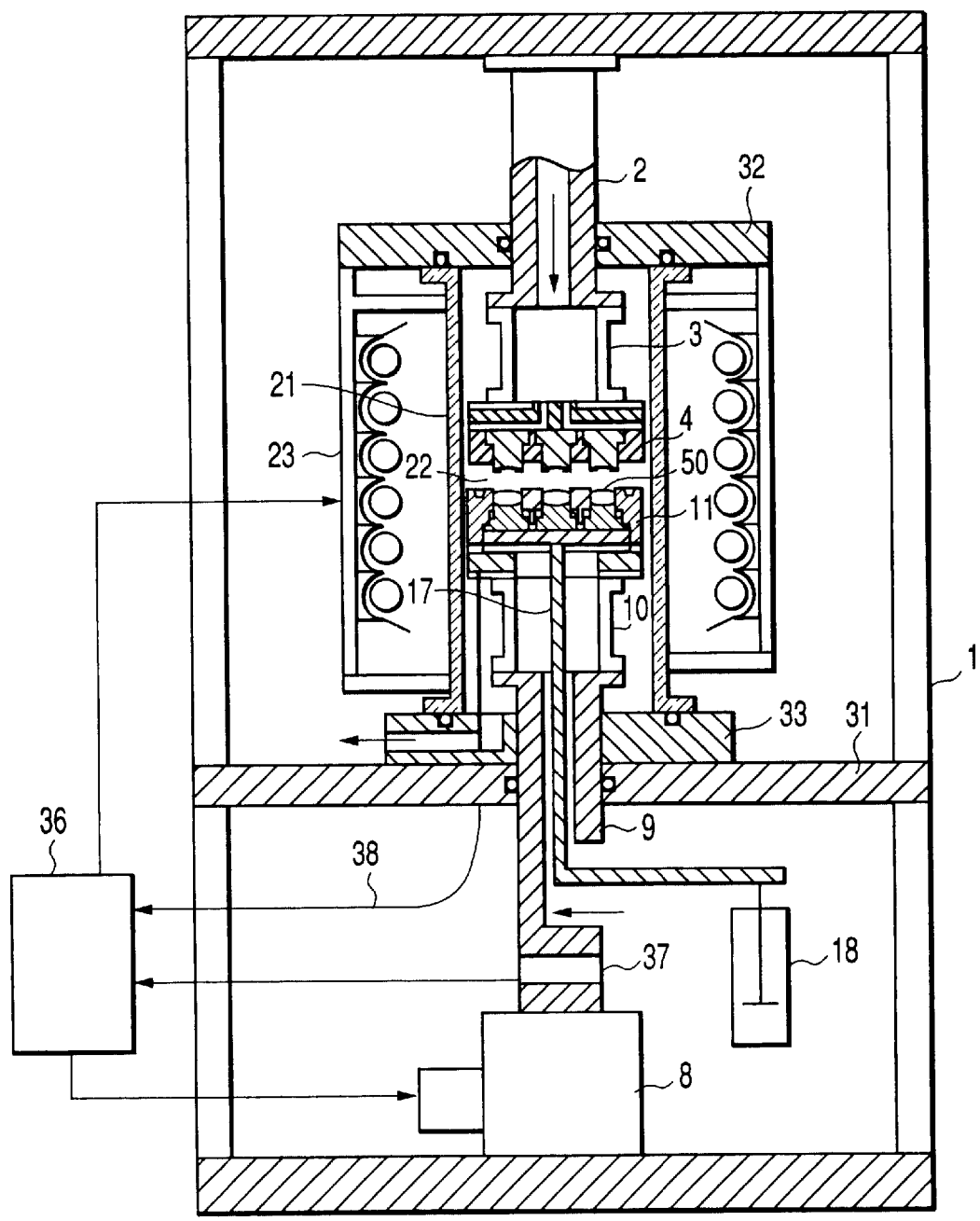
FIG. 1 is a view showing a schematic structure of a press-forming machine for glass according to the present invention.

FIG. 1 shows a press-forming machine for glass according to the present invention. In the figure, reference numeral 2 denotes an upper shaft, 4 an upper die, 9 a lower shaft, 11 a lower die, 17 an ejector pin, and 50 a preform made of glass, which is to be subjected to press-forming.

The upper shaft 2 extends downward from the upper portion of a frame 1. The upper die 4 is attached to the lower end of the upper shaft 2 via an insulating cylinder 3 made of ceramic. A driving apparatus 8 is arranged in the lower portion of the frame 1. To the driving apparatus 8, the lower shaft 9 is attached. The lower shaft 9 extends upward through a base plate 31 of the frame 1 so as to face the upper shaft 2. To the upper end of the lower shaft 9, the lower die 11 is attached via an insulating cylinder 10. The detailed structures of the upper and lower dies 4 and 11 will be explained later with reference to another drawing.

The ejector pin 17 is installed within the lower shaft 9. The ejector pin 17 passes through the core portion of the insulating cylinder 10 and reaches the lower die 11. The tip of the ejector pin 17 is inserted into the lower die 11. The ejector pin 17 is moved up and down by an air cylinder 18, which is connected to the lower end.

The upper die 4 and the lower die 11 as well as the upper and lower insulating cylinders 3 and 10 are housed in a transparent quartz tube 21. An upper plate 32 is attached so as to surround the portion near the lower end portion of the upper shaft 2. Similarly, a lower plate 33 is attached so as to surround the portion near the upper end portion of the lower shaft 7. The lower plate 33 is mounted on and supported by the base plate 31. An O-ring is attached to the contact surface between the upper end surface of the quartz tube 21 and the upper plate 32, thereby sealing the contact surface. Similarly, an O-ring is attached to the contact surface between the lower end surface of the quartz tube 21 and the lower plate 33 to seal the contact surface. Since the forming chamber 22 is formed within the quartz tube 21 in this manner, the atmosphere of the forming chamber 22 can be controlled.

An infrared lamp unit 23 is arranged so as to surround the quart pipe 21. The infrared lamp unit 23 is formed of infrared lamps and reflection mirrors.

The quartz tube 21 and the infrared lamp unit 23 are suspended from the lower surface of the upper plate 32. When a preform is supplied to a die and a formed product is taken out from the die, the upper plate 32 is moved upward by a driving unit (not shown) to move aside the quartz tube 21 and the infrared lamp unit 23.

A load cell 37 is inserted into the connecting portion between the driving unit 8 and the lower shaft 9. A thermocouple 38 is attached to the lower die 11. The output signals from the load cell 37 and the thermocouple 38 are sent to a control unit 36, which then controls the driving apparatus 8 and the infrared lamp unit 23 based on the output signals.

Figure 2:
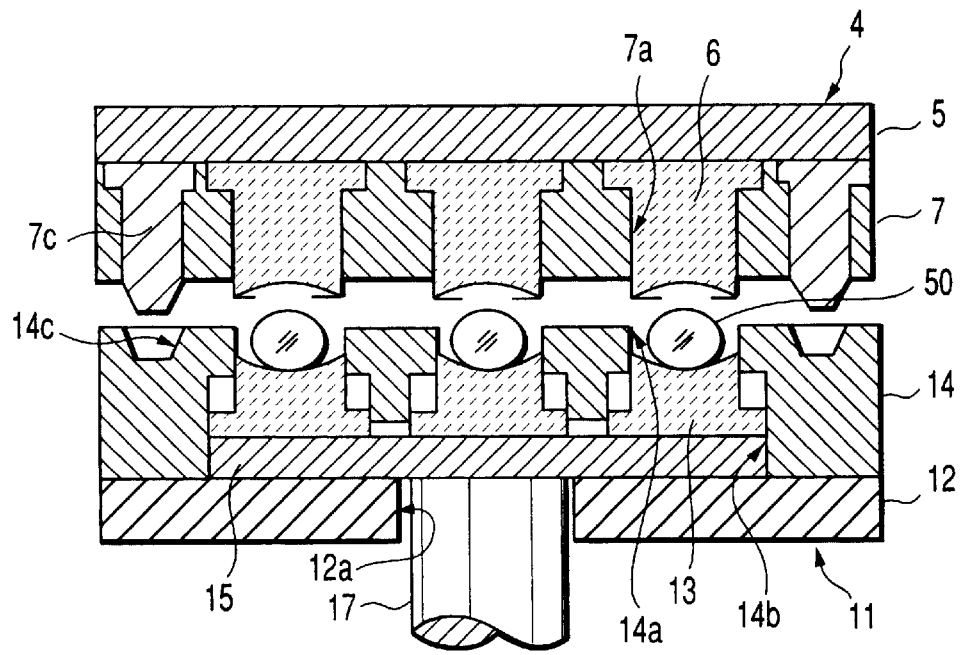
FIG. 2 is an enlarged sectional view of a portion of the dies of the press-forming machine according to the present invention before press forming.

FIG. 2 shows an enlarged view of the die portion consisting of the upper die 4 and the lower die 11. In the figure, reference numeral 5 denotes a die plate, 6 a core, 7 a cavity die, 12 a die plate, 13 a core, 14 a cavity die, 14a a first opening portion, 14b a second opening portion, 15 a slide plate, 17 an ejector pin, and 50 a preform made of glass.

The upper die 4 is formed of the die plate 5 made of metal, a plurality of cores 6 made of ceramic, and the cavity die 7 made of metal. A plurality of opening portions 7a is formed in the cavity die 7. A core 6 is fitted in each opening portion 7a. The cavity die 7 is fitted to the lower surface of the die plate 5, supporting each core 6 from its periphery. The pattern-formed surface of the core 6 protrudes downward from the lower surface of the cavity die 7.

The lower die 11 is formed of the die plate 12 made of metal, a plurality of cores 13 made of ceramic, the cavity die 14 made of metal, and a slide plate 15.

The cavity die 14 has a plurality of opening portions 14a (referred to as "first opening portions") at the upper side and a single opening portion 14b (referred to a "second opening portion") at the lower side. The bottom portion of each of the first opening portions 14a communicates with the second opening portion 14b. A single core 13 is fitted in each of the first opening portions 14. The slide plate 15 is placed in the second opening portion 14b, supporting the core 13 from the lower side. The cavity die 14 is fixed on the upper surface of the die plate 12.

The core 13 of the lower die 11 can be slid up and down along the inner peripheral surface of the first opening portion 14a of the cavity die 14. Similarly, the slide plate 15 can be slid up and down along the inner peripheral surface of the second opening portion 14b of the cavity die 14. When the slide plate 15 is in contact with the upper surface of the die plate 12 (placed at the lower most position), the pattern-formed surface of the core 13 is recessed from the upper surface of the cavity die 14. The inner peripheral surface of the first opening portion 14a forms the side surface portion of the pattern-formed portion.

To align the shafts of the upper die 4 and the lower die 11 with each other, two guide pins 7c are embedded in the peripheral edge portion of the cavity die 7 of the upper die 4, whereas guide holes 14c are formed in the peripheral edge portion of the cavity die 14 of the lower die 11 so as to correspond to the two guide pins 7c.

At the center of the die plate 12, a through hole 12a is formed so as to extend vertically. As mentioned above, the ejector pin 17 is installed within the lower shaft 9 (FIG. 1). The tip of the ejector pin 17 is inserted into the through hole 12a formed in the die plate 12.

Next, the steps of manufacturing optical lenses by the press-forming machine (FIG. 1) will be explained with reference to FIGS. 2 to 4.

FIG. 2 shows the states of the upper die 4, lower die 11 and preform 50 immediately before press forming is initiated. As the preform 50, a gob-form preform is used. After the preform 50 is set on each core 13, the upper die 4 and lower die 11 are allowed to approach as close as possible. While an inert gas is supplied in the forming chamber 22 (FIG. 1), the upper die 4, lower die 11 and preform 50 kept in this state are heated up by the infrared lamp unit 23 (FIG. 1).

Figure 3:
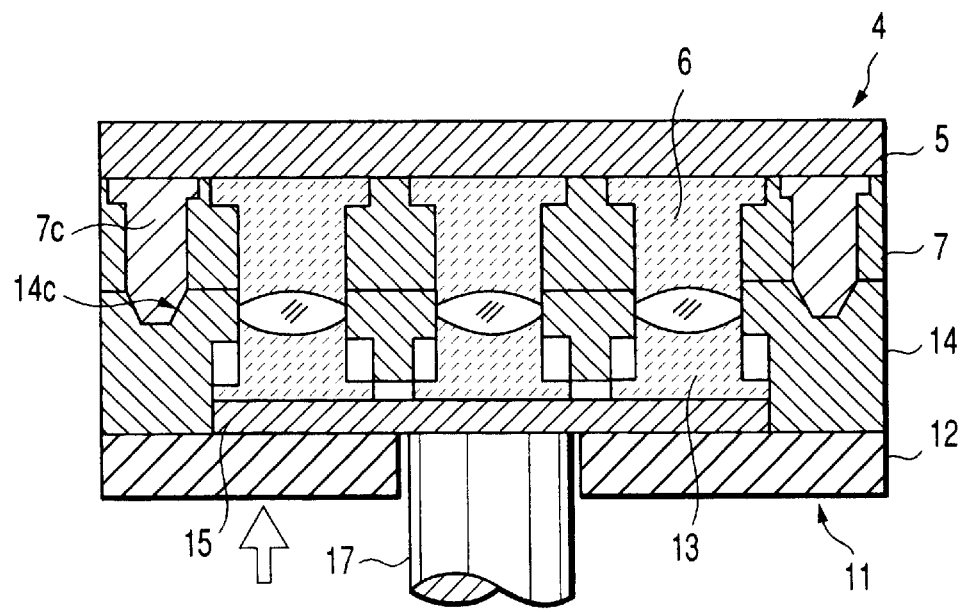
FIG. 3 is an enlarged sectional view of the portion of the dies of the press-forming machine according to the present invention during press forming.
Figure 4:
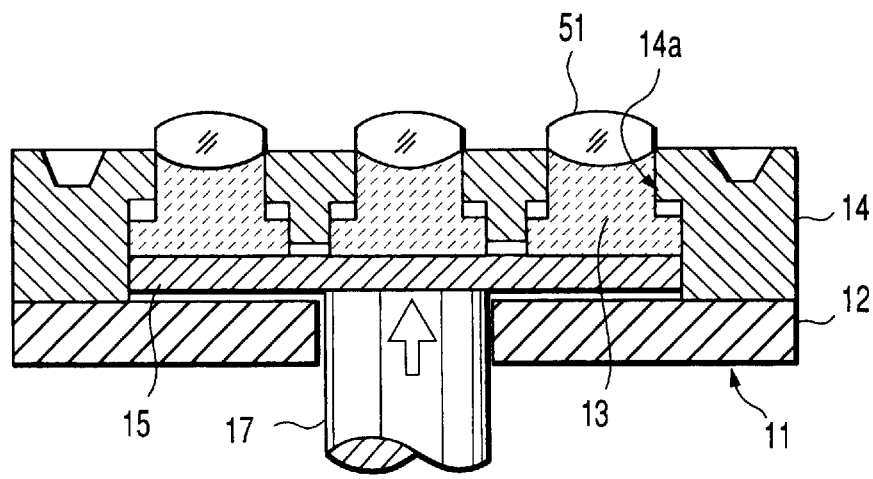
FIG. 4 is an enlarged sectional view of the dies of the press-forming machine according to the present invention after press forming (formed products are pushed out from a lower die)

After the preform 50 reaches and stabilizes at a predetermined temperature, the lower shaft 9 (FIG. 1) is moved upward to push the upper surface of the lower cavity die 14 against the lower surface of the upper cavity die 7, as shown in FIG. 3. In this way, the preform 50 is press-formed in the cavity surrounded by the pattern-formed surfaces of the core 6 and core 13, and the inner peripheral surface of the first opening portion 14a of the cavity die 14.

After press forming is finished, an inert gas is supplied into the forming chamber 22 while the dies are closed. In this way, the upper die 4, the lower die 11 and a formed product are cooled. After the formed product was cooled to a predetermined temperature, the lower shaft 9 is moved down to open the dies. Subsequently, the ejector pin 17 is moved to push up the slide plate 15.

In this way, the cores 13 are pushed up along the inner periphery of the first opening portion 14a of the cavity die 14 and then formed products are pushed out from the cavity die 14. Since the upper die 4 has been moved aside, it is omitted from FIG. 4.

In the aforementioned embodiment, the forming machine is configured to leave formed products in the lower die. Conversely, the forming machine may be configured to leave formed products in the upper die. In the latter case, an ejector pin is arranged at the upper shaft side. The formed products are taken out by pushing down the cores of the upper die by the ejector pin.

Now, the case where an optical lenses are manufactured by using a press-forming machine according to the present invention will be explained.

Figure 5:
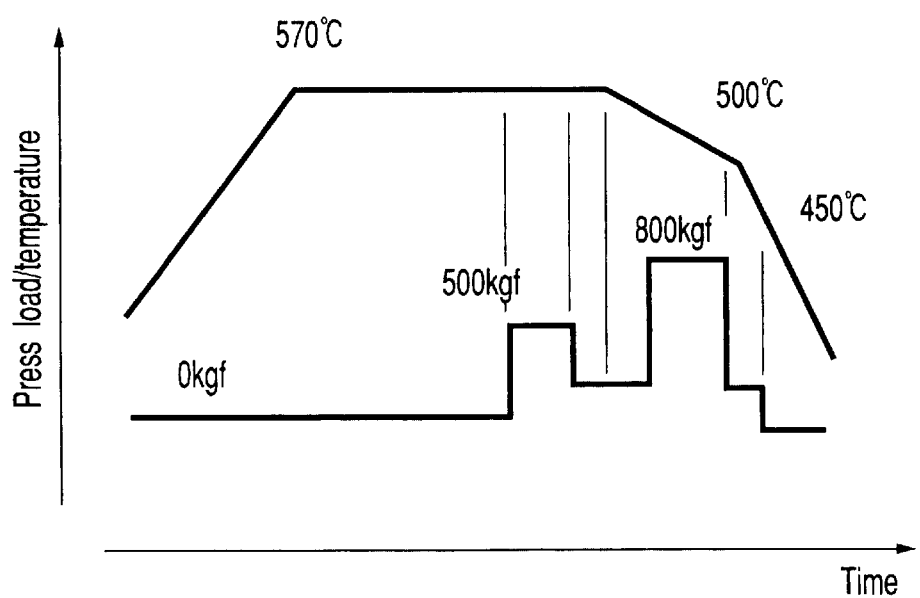
FIG. 5 is a chart showing the conditions employed when the press-forming machine according to the present invention is used for manufacturing optical lenses.

The following preform made of glass was used.
Manufacturer: Ohara Incorporated.
Model Number: L-BAL42
Glass Transition point: 506° C.
Yield point: 538° C.
Shape: Gob
Weight: 0.9 g FIG. 5 shows program patterns of temperature and press load with time when the aforementioned preform is press-formed.

An aspheric biconvex lens of 13 mm diameter was formed under the aforementioned conditions. The formed lens had the following accuracy of dimension:

| | |
|---|---|
| Surface roughness of upper and lower optical surfaces: | about $\lambda/8$ |
| Alignment deviation of the cores of upper and lower optical surfaces: | within 1 $\mu$m |
| parallelism of the upper and lower surfaces: | within 15 sec. |
| Accuracy of dimension of outer peripheral portion: | within ±0.01 mm |
| Accuracy of thickness of lens: | within ±0.01 mm |

After the press forming was completed, the cores 13 were pushed up by the ejector pin 17 in accordance with the procedure mentioned above. As a result, a formed products were easily taken out from the cavity die 14. No scratch was observed in the formed products.

Figure 6:
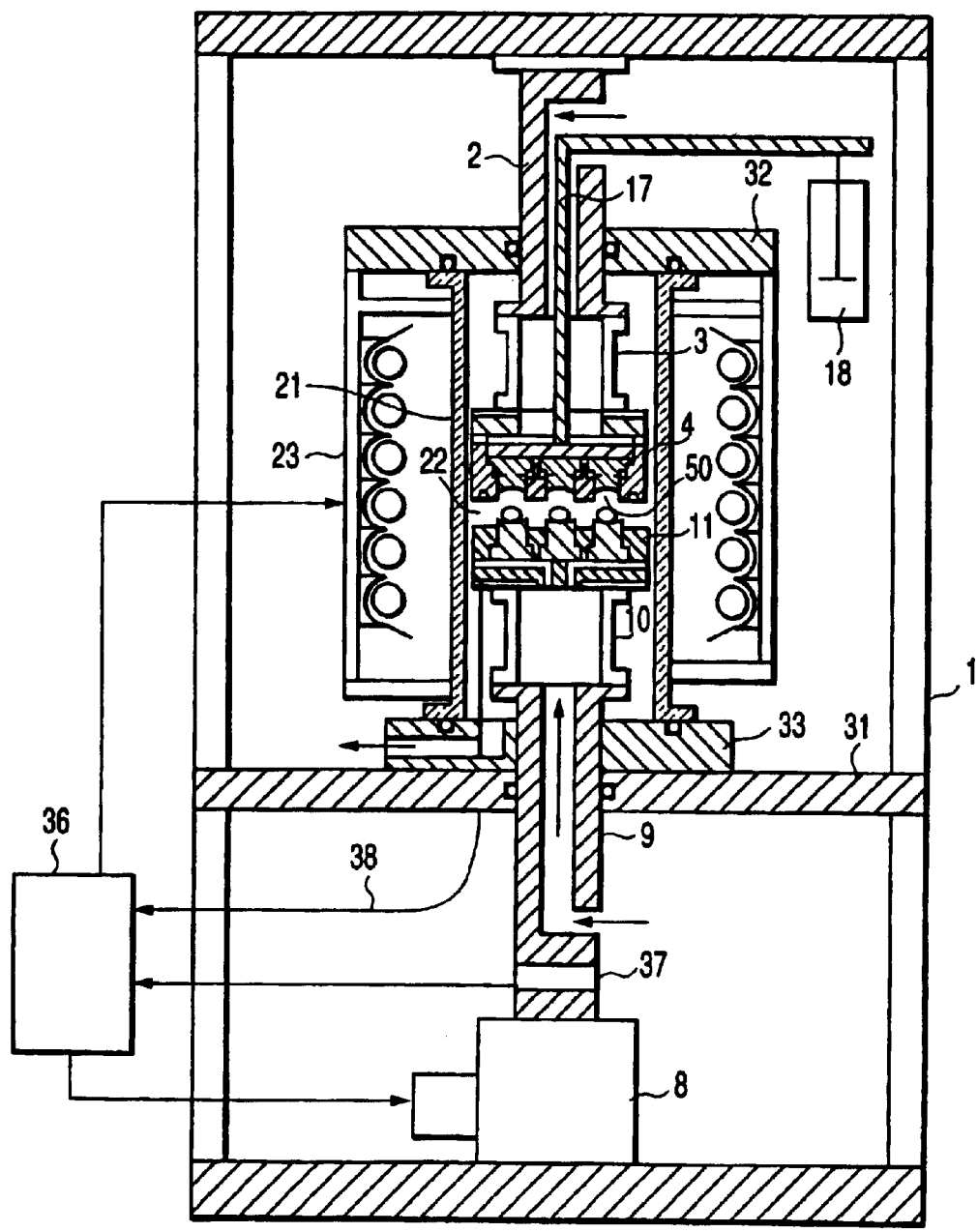
FIG. 6 is a view showing a schematic structure or another embodiment of press-forming machine.

FIG. 6 is a view showing a schematic structure or another embodiment of press-forming machine.

Figure 7:
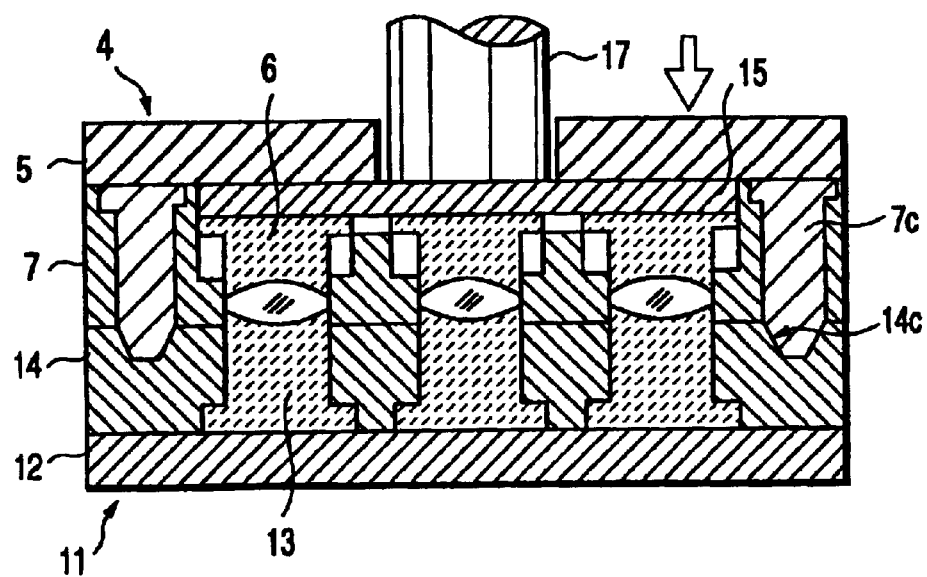
FIG. 7 is an enlarged sectional view of the dies of another embodiment of press-forming machine.

FIG. 7 is an enlarged sectional view of the dies of another embodiment of press-forming machine.

FIGS. 6 and 7 show a vertical inverting of the lower die 11, upper die 4 and ejector pin 17 shown in FIGS. 1 and 3. The lower die may be substituted by an upper die formed of the same structural elements as those of the lower die, namely, cores, a cavity die, die plate and slide plate. Further, the upper shaft is equipped with an ejector pin for pushing down the cores therein.

According to the press-forming machine for glass of the present invention, a product can be taken out from a die without damage after press forming. Therefore, according to the press-forming machine of the present invention, it is possible to simplify the structure of auto-transferring mechanism of a formed product and simultaneously improve the productivity of the machine.

What is claimed is:

1. A press-forming machine for glass for performing press-forming of glass at elevated temperature by using an upper die supported by an upper shaft from an upper surface side and a lower die supported by a lower shaft from a lower surface side, said lower die comprising:

a core having a pattern on an upper surface;

a cavity die surrounding the outer periphery of the core and guiding the core along the outer periphery; and a die plate supporting the core and the cavity die from the lower-surface side and having a vertically extended through-hole formed therein, wherein a vertically movable ejector pin is installed within the lower shaft, the tip of the ejector pin being inserted into the through-hole, and a formed product is pushed out from the cavity die by pushing up the core by the ejector pin.

2. A press-forming machine for glass for performing press-forming of glass at elevated temperature by using an upper die supported by an upper shaft from an upper surface side and a lower die supported by a lower shaft from a lower surface side, said lower die comprising:

a plurality of cores each having a pattern on an upper surface thereof a cavity die having a plurality of first opening portions at an upper surface side and a second opening portion at the lower surface side, each of said first opening portions communicating with said second opening portion and guiding the corresponding core from an outer peripheral side;

a slide plate housed in the second opening portion and supporting each of said plurality of cores from a lower surface side; and a die plate supporting the slide plate and cavity die from the lower surface side and having a vertically extended through-hole formed therein, wherein a vertically movable ejector pin is installed within the lower shaft, the tip of the ejector pin being inserted into the through-hole, and a formed product is pushed out from the cavity die by pushing up the core via the slide plate by the ejector pin.

3. A press-forming machine for glass for performing press-forming of glass at elevated temperature by using an upper die supported by an upper shaft from an upper surface side and a lower die supported by a lower shaft from a lower surface side, said upper die comprising:

a core having a pattern on a lower surface;

a cavity die surrounding the outer periphery of the core and guiding the core along the outer periphery; and a die plate supporting the core and the cavity die from the upper-surface side and having a vertically extended through-hole formed therein, wherein a vertically movable ejector pin is installed within the upper shaft, the tip of the ejector pin being inserted into the through-hole, and a formed product is pushed out from the cavity die by pushing down the core by the ejector pin.

4. A press-forming machine for glass for performing press-forming of glass at elevated temperature by using an upper die supported by an upper shaft from an upper surface side and a lower die supported by a lower shaft from a lower surface side, said upper die comprising:

a plurality of cores each having a pattern on a lower surface thereof;

a cavity die having a plurality of first opening portions at a lower surface side and a second opening portion at the upper surface side, each of said first opening portions communicating with said second opening portion and guiding the corresponding core from an outer peripheral side;

a slide plate housed in the second opening portion and supporting each of said plurality of cores from an upper surface side; and a die plate supporting the slide plate and cavity die from the upper surface side and having a vertically extended through-hole formed therein, wherein a vertically movable ejector pin is installed within the upper shaft, the tip of the ejector pin being inserted into the through-hole, and a formed product is pushed out from the cavity die by pushing down the core via the slide plate by the ejector pin.

* * * * *